(12) United States Patent
Kovacevic et al.

(10) Patent No.: US 12,118,673 B2
(45) Date of Patent: Oct. 15, 2024

(54) METHOD AND SYSTEM FOR DISPLAYING A VIRTUAL SCENE

(71) Applicant: Orqa Holding LTD, Dublin (IE)

(72) Inventors: Srdjan Kovacevic, Osijek (HR); Ana Petrinec, Osijek (HR)

(73) Assignee: Orqa Holding LTD, Dublin (IE)

( * ) Notice: Subject to any disclaimer, the term of this patent is extended or adjusted under 35 U.S.C. 154(b) by 77 days.

(21) Appl. No.: 17/864,070

(22) Filed: Jul. 13, 2022

(65) Prior Publication Data

US 2024/0020927 A1    Jan. 18, 2024

(51) Int. Cl.
| | | |
|---|---|---|
| G06T 19/00 | (2011.01) | |
| G06T 15/00 | (2011.01) | |
| G06T 17/00 | (2006.01) | |
| H04N 23/698 | (2023.01) | |
| H04N 23/90 | (2023.01) | |

(52) U.S. Cl.
CPC .......... *G06T 19/003* (2013.01); *G06T 15/005* (2013.01); *G06T 17/00* (2013.01); *H04N 23/698* (2023.01); *H04N 23/90* (2023.01)

(58) Field of Classification Search
None
See application file for complete search history.

(56) References Cited

U.S. PATENT DOCUMENTS

| | | | | |
|---|---|---|---|---|
| 6,141,034 A | | 10/2000 | McCutchen | |
| 8,493,380 B2 * | | 7/2013 | Aihara | G06T 15/205 |
| | | | | 345/419 |
| 10,614,553 B1 * | | 4/2020 | Wang | H04N 5/265 |
| 2010/0201833 A1 * | | 8/2010 | Kamiya | G08B 13/1963 |
| | | | | 348/222.1 |
| 2013/0002809 A1 * | | 1/2013 | Shimizu | H04N 23/698 |
| | | | | 348/E7.001 |

(Continued)

FOREIGN PATENT DOCUMENTS

WO    2024/013137 A1    1/2024

OTHER PUBLICATIONS

Marchese et al.; "CrystalDome: A Projected Hemispherical Display with a Gestural Interface;" IEEE 11th International Conference Information Visualization (IV '07), pp. 734-742) (Year: 2007).*

(Continued)

*Primary Examiner* — Edward Martello
(74) *Attorney, Agent, or Firm* — Lloyd & Mousilli; Benjamin M. Hanrahan

(57) ABSTRACT

A method for positioning of cameras on an object that enables accurate rendering of the scene around the object on a dome accurately in real time. The method involves providing a 3D model of the object having a surface, and selecting locations on the surface where the cameras are to be placed to provide a camera rig. The choice of locations is such that every camera has a field of view that overlaps with at least one other camera. The cameras are designated as Direct View Camera (DVC) or a Secondary View Camera (SVC). The method to render a virtual scene includes providing a projection rig that includes a plurality of projectors within a hollow half-sphere, wherein the hollow half-sphere includes an inner surface and an outer surface. Each of the plurality of projectors is designated as a Direct View Projector (DVP) or a Secondary View Projector (SVP).

19 Claims, 5 Drawing Sheets

(56) References Cited

U.S. PATENT DOCUMENTS

| | | | | |
|---|---|---|---|---|
| 2013/0293683 A1* | 11/2013 | Zhou | .................... | H04N 23/698 |
| | | | | 348/148 |
| 2015/0178884 A1* | 6/2015 | Scholl | ....................... | B60R 1/00 |
| | | | | 382/104 |
| 2015/0329048 A1* | 11/2015 | Wang | ....................... | B60R 1/00 |
| | | | | 348/148 |
| 2016/0155219 A1* | 6/2016 | Shigemura | ................ | G06T 5/50 |
| | | | | 382/284 |
| 2018/0365859 A1* | 12/2018 | Oba | ....................... | H04N 23/90 |
| 2019/0197666 A1* | 6/2019 | Oikkonen | ............. | G06T 3/4038 |

OTHER PUBLICATIONS

PCT International Search Report, and Written Opinion of the International Searching Authority for International Patent Application No. PCT/EP2023/069127 | dated Sep. 29, 2023.

* cited by examiner

METHOD AND SYSTEM FOR DISPLAYING A VIRTUAL SCENE

TECHNICAL FIELD

The present disclosure relates generally to providing a virtual rendering of a scene and more specifically to a method for positioning cameras on an object that allows for accurate rendering of a virtual scene on a real time basis.

BACKGROUND

Virtual reality scenes are generally created by capturing videos or images using special techniques and then rendered using special algorithms on a screen to allow users to get a fully immersive experience.

The 360° video is a special kind of video media, which is recorded by capturing the entire scene around the camera, rather than just a portion of the scene in front of the camera, which is limited by the camera's field of view (FoV). The typical 360° video setup enables an immersive viewing experience, by placing the viewer in the center of the scene, which allows them to view the entire scene by looking around. Typically, such 360° videos are viewed using a video headset, like for example a virtual reality (VR) headset.

Video headsets are typically equipped with sensors, which determine the head pose in 3 or 6 degrees of freedom (DoF). In a 3DoF setup, the headset determines the head pose described with three parameters corresponding to three angles of rotation around the three axes (x, y, and z); the three angles are typically called roll, pitch (or sometimes tilt), and yaw (or sometimes pan), respectively. Further, in a 3DoF setup the headset will track the user's head pose by repeatedly updating the three angles, which are then used to adjust the video image that is displayed to the user at any given moment, so the user's current perspective at every moment corresponds to the head pose currently registered by the headset.

In reality, user's head movements are not strictly limited to three angles of rotation, there are linear movements also along the three axes (x, y, and z). However, 3DoF systems are not able to capture those linear movements, so the user's visual experience is limited only to rotational movements, as if the vantage point is always fixed in a single point positioned in the origin of the x, y, and z axes. The 6DoF systems are able to capture these linear movements too, so the user has the experience of full three-dimensional linear movement, in addition to the rotational movement.

Typical camera rigs for capturing immersive, 360° video setups require multiple cameras to ideally be arranged in a perfect circle or a perfect sphere with cameras facing outward, and with identical overlap between the cameras' field of view, so the images can be algorithmically recombined in an immersive virtual scene. Special algorithms need to be applied in order to deform and stitch separate camera feeds which can then be recombined into 360° video frames, which can then be viewed by the user via an immersive video headset.

Camera rigs typically used for 360° video capture are often cumbersome, and if they are to be used for teleoperation, they often cannot be integrated on the vehicle in a manner that is practical, inconspicuous and/or robust. Furthermore, such setups are able to provide only one vantage point for the user, the one at the center of the circle/sphere along which cameras are arranged on the rig.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing a camera rig by positioning of cameras on a 3D model of the object having a surface. Each camera is then designated either as a Direct View Camera (DVC) or a Secondary View Camera (SVC). Then, the method comprises specifying each camera with a direction, a rotation along a longitudinal axis and a field of view.

Certain embodiments disclosed herein also include a method for rendering a virtual scene. The method includes providing the camera rig as described herein. The method then includes providing a projection rig that includes a plurality of projectors within a hollow half-sphere, wherein the hollow half-sphere includes an inner surface and an outer surface. Each of the plurality of projectors is designated as a Direct View Projector (DVP) or a Secondary View Projector (SVP). Each DVP corresponds to a DVC such that each DVP has identical spatial position, direction, rotation along a longitudinal axis and field of view of the corresponding DVC. Also, each DVP is capable of receiving images from the corresponding DVC. The method further involves arbitrary (free) positioning of the SVP, wherein each SVP corresponding to one SVC on the camera rig, with each SVP being capable of receiving images from the corresponding SVC. The method then involves projecting by the projector the images obtained from the corresponding camera onto the inner surface of the hollow half-sphere.

In another aspect, the invention provides a system for virtual rendering of space around an object to a user. The system includes a camera rig on an object and a projection rig as described herein. The system also includes a projection dome onto which the DVPs and SVPs project the images received from the corresponding cameras. Thus, the space around an object is rendered to a user in a way that DVPs provide a view of the space equivalent to the experience of looking through a window, whereas SVPs provide a view of the space equivalent to the experience of looking at secondary viewing devices in a vehicle (e.g., rear-view mirrors or in-cockpit displays showing a feed from rear-view or side-view camera). The arbitrary positioning of the SVP's within the hollow sphere determines the positioning of the views from these virtual secondary viewing devices within the user's virtual environment, and it can be adapted to a given application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
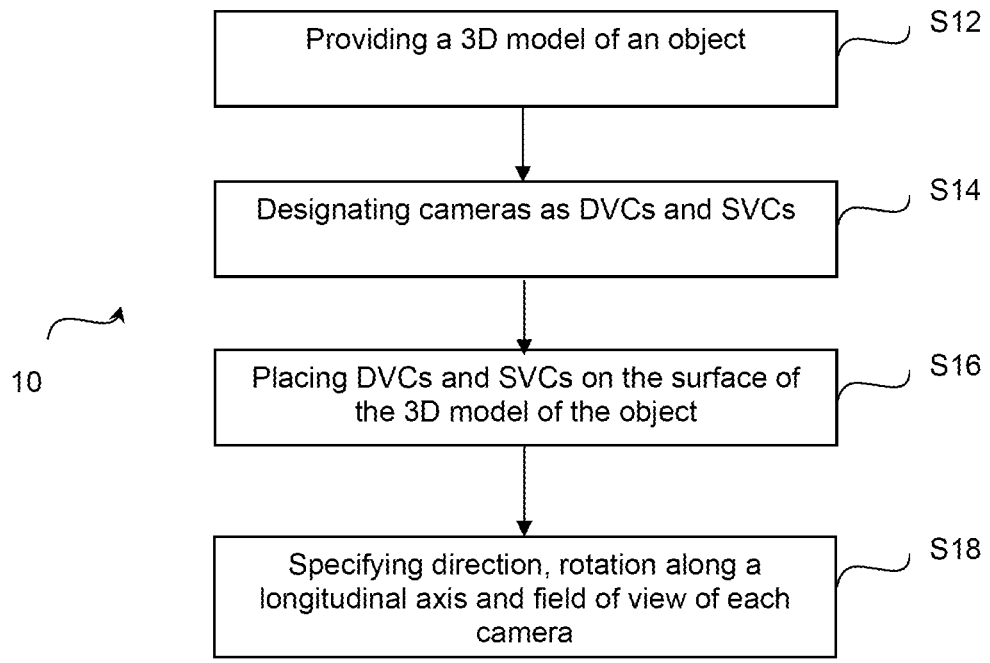
FIG. 1 is a flowchart representation of the steps involved in the method for positioning cameras on a camera rig, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

As used herein, "Camera Rig" is used to mean a plurality of cameras arranged in a particular configuration and mounted on an object.

As noted herein a method for providing a camera rig is provided. FIG. 1 is a flowchart 10 of a method of positioning at least two cameras, according to an embodiment. At S12, a 3D model of the object is provided, wherein the 3D model includes a surface. Then, at S14, the cameras are designated as Direct View Camera (DVC) or a Secondary View Camera (SVC). Next, at S16 DVCs and SVCs-designated cameras are placed on the surface of a 3D model. Finally, at S18 for each camera, direction, rotation along a longitudinal axis and field of view is specified.

The locations for placing the DVCs are chosen in such a way that ensures that the field of view of each individual camera is sufficiently overlapping with the fields of view of its neighboring cameras, in order to create the degree of visibility that will satisfy a particular application or use case, in a way that will minimize the total number of cameras being used. The location for placing cameras on the surface of the 3D model may be aligned in such a way that it fits a certain geometric pattern, or it could be randomly shaped as long as it fits into the criteria of overlapping fields of view.

The locations for placing SVCs are chosen in such a way that ensures that the field of view of each individual camera covers a certain 'blind spot', which was not covered in the collective field of view of the DVC's, but is nevertheless relevant for a particular application or use case. For instance, each camera is also associated with a blind volume. The location is also associated with an importance weight that may be user defined or it may be estimated based on a number of predefined factors. Subsequently, based on all the locations, an objective function is estimated. This step is repeated for a different set of locations until a minimum objective function is arrived at.

Placement of each individual camera in a given arrangement of a camera rig is generally described by the three cartesian coordinates (x, y, z) determining the position of the camera, and three angles (pitch, yaw, roll) determining the direction the camera is pointed to (pitch, yaw) and an angle of its rotation around its longitudinal axis (roll).

Camera Positioning in a Camera Rig

One of the advantages of the method as disclosed is that the camera arrangement does not necessarily need to be 'regular' (like, e.g., a perfect circle, or perfect sphere), and can be adapted to particular circumstances of each implementation (e.g., the camera arrangement can be specifically adapted to a specific geometry, or a specific operational context of each different type of vehicle).

The methods as disclosed are particularly useful in rendering a virtual reality rendering of a scene on a real time basis of events occurring that are captured by the camera placed on the camera rigs. The methods are particularly useful in rendering scenes occurring outside a vehicle to a driver of the vehicle.

Figure 2:
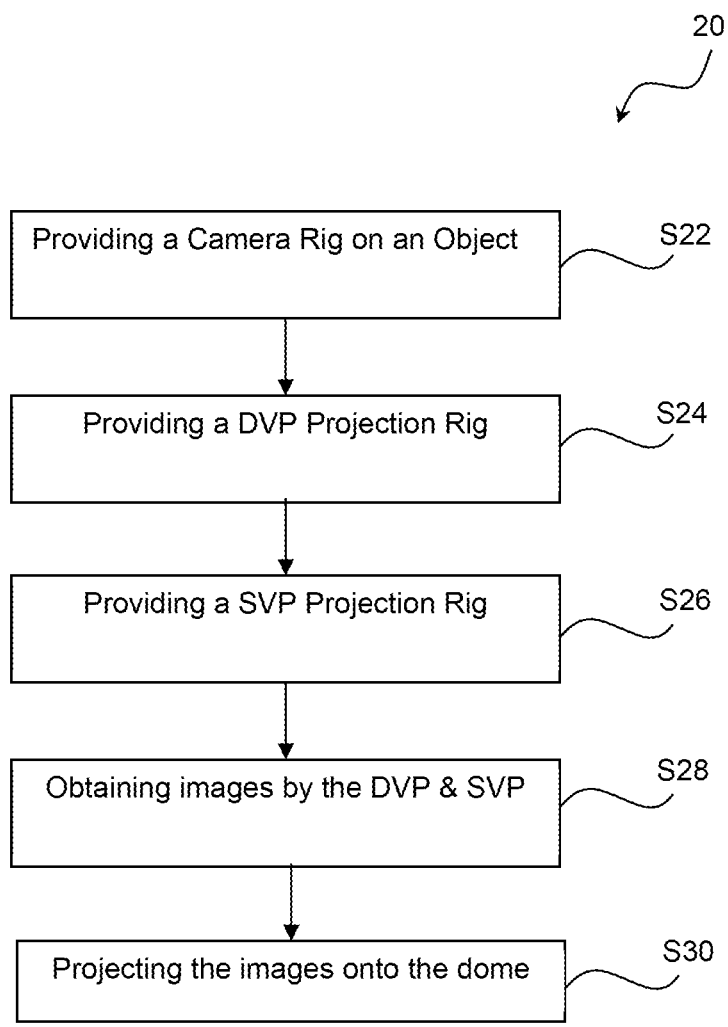
FIG. 2 is a block diagrammatic representation of the components of the system for rendering a virtual scene to a user, according to an embodiment.

Thus, as already noted, the embodiments provide a method for rendering a virtual scene. FIG. 2 is a flowchart 20 of a method for rendering a virtual scene to a user, shown generally by numeral 20. At S22, a camera rig is provided on an object based on a selection of locations on a 3D model of the object. Next, at S24, a DVP projection rig is provided that includes a plurality of DVPs within a hollow half-sphere. Here, each DVP corresponds to a DVC on the camera rig such that each DVP has identical spatial position, direction, rotation along the longitudinal axis, and field of view of the corresponding DVC. Thereafter, at S26 an SVP projection rig that includes a plurality of SVPs within a hollow half-sphere is provided. Here, the spatial position, direction, rotation along the longitudinal axis, and field of view of each SVP is freely adjusted so that its projection is positioned on the inner surface of the hollow half-sphere so that it will satisfy a particular application or use case (e.g. the projection may be positioned in a way that will provide an experience and the function of a rear-view mirror or an in-cockpit display showing a feed from rear-view or side-view camera). Spatial position is typically defined by the Cartesian coordinates, while direction is defined by pitch and yaw, and rotation along the longitudinal axis is defined by roll. It is noted that both DVPs and SVPs are configured to receive camera feed from the camera rig and project it onto an inner surface of the hollow half-sphere.

Next, at S28, images are obtained by the respective projection rigs from the corresponding cameras. Here, the camera feed typically includes video streams that are generally accompanied by audio, but may only be a video feed, and sometimes may also be a series of images. The hollow half-sphere, also sometimes referred to as a dome, serves as a virtual projection screen for the projection rigs. Further the field of view of each projector on the DVP projection rig is exactly the same as that of the camera at that corresponding location on the camera rig, where the field of view of each projector on the SVP projection rig can be adjusted so that it will satisfy a particular application or use case.

The video streams obtained from the cameras are used to render a virtual scene which can be displayed to the user via VR headset as a realistic and spatially accurate representation of the portion of real world being captured by the camera rig, and through which virtual scene the user can virtually move using a VR headset. One skilled in the art will understand that any virtual projector can be implemented using an existing class of virtual objects typically available in any 3D engine (e.g., Projector class of objects in Unity 3D Engine https://docs.unity3d.com/560/Documentation/Manual/class-Projector.html, or Projector Interactable Blueprint class of objects in Unreal 3D Engine https://www.unrealengine.com/marketplace/en-US/product/projector).

The real-world environment within which the camera rig is placed can be reconstructed in the virtual world if each virtual projector on the projection rig receives live video feed from its corresponding camera on the camera rig, and projects this video feed onto the inner surface of the dome. If a user is equipped with a VR headset, and user's virtual vantage point is placed within the dome, user will experience a highly accurate and immersive visual representation of the real scene.

Figure 3:
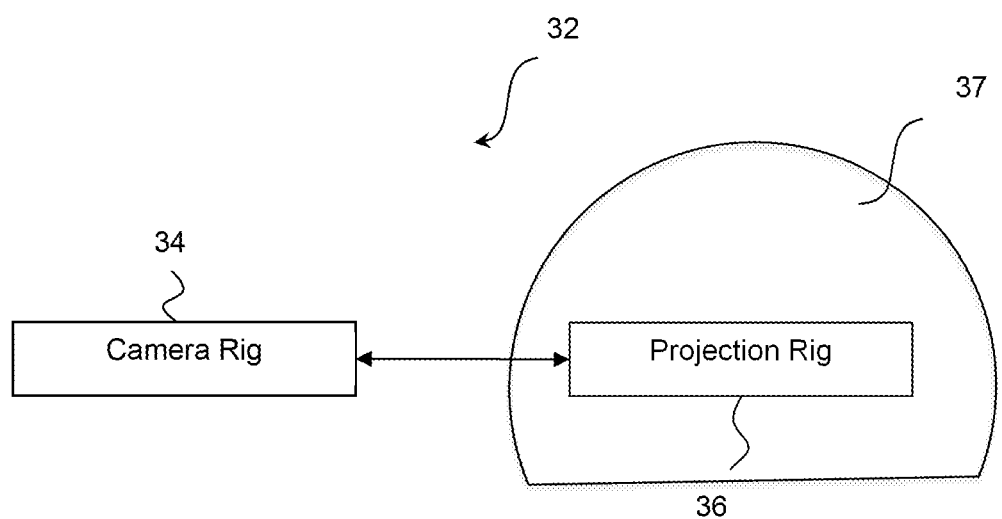
FIG. 3 is a schematic representation of the camera rig on a vehicle and a projection rig in the Dome, according to an embodiment.

Thus, in yet another aspect, the present disclosure provides a system for virtual rendering of a space around an object to a user using the methods as described herein. FIG. 3 is a block diagram of the components of a system 32 of the embodiments. The system 32 includes a camera rig 34 provided on an object, and a projection rig 36 provided within a hollow half-sphere or a dome 37. The positions of the cameras on the camera rig 34 are chosen as described herein, and the projection rig 36 is configured such that every DVP is situated at the corresponding virtual rendering of the location of the camera having the same field of view, and every SVP is situated freely, so that their field of view and arrangement of their projections will satisfy a particular application or use case.

Figure 4A:
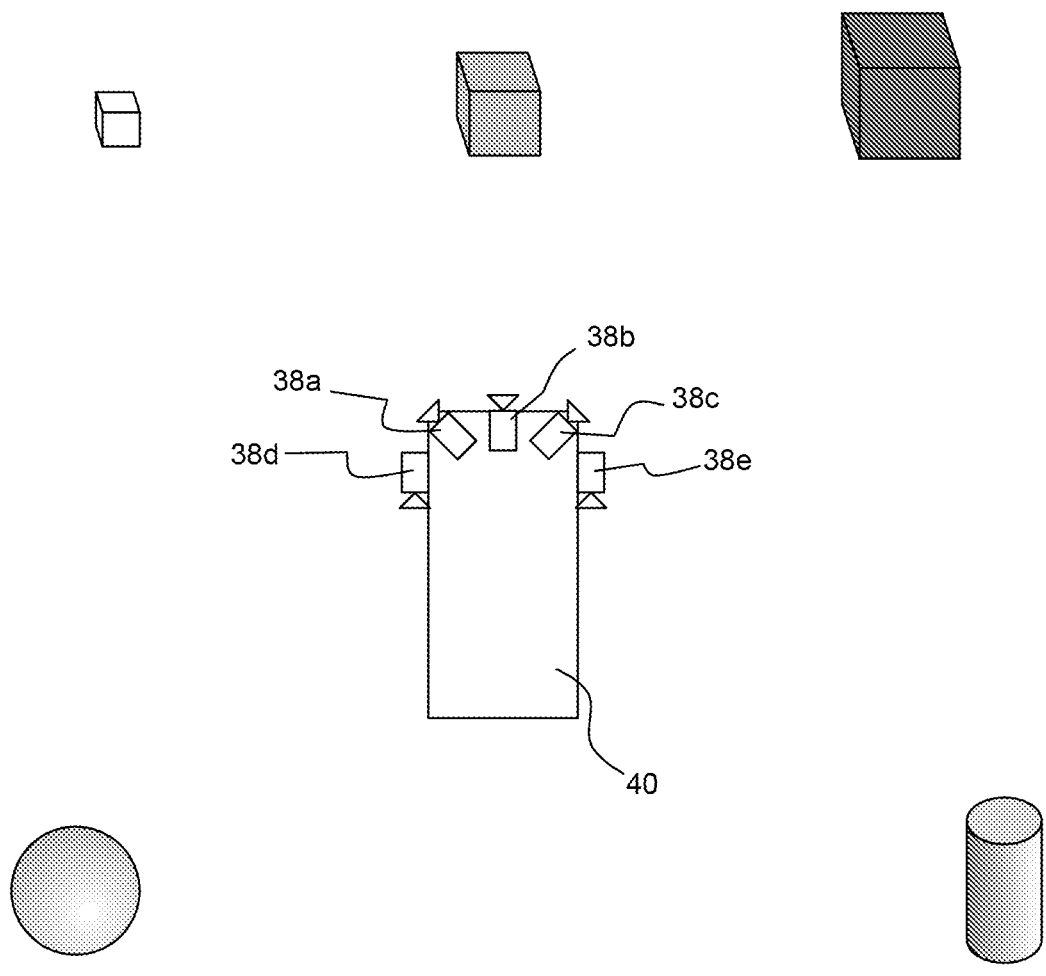
FIG. 4A is an exemplary scene to be rendered virtually, wherein the object is a vehicle in which the user is present, according to an embodiment.
Figure 4B:
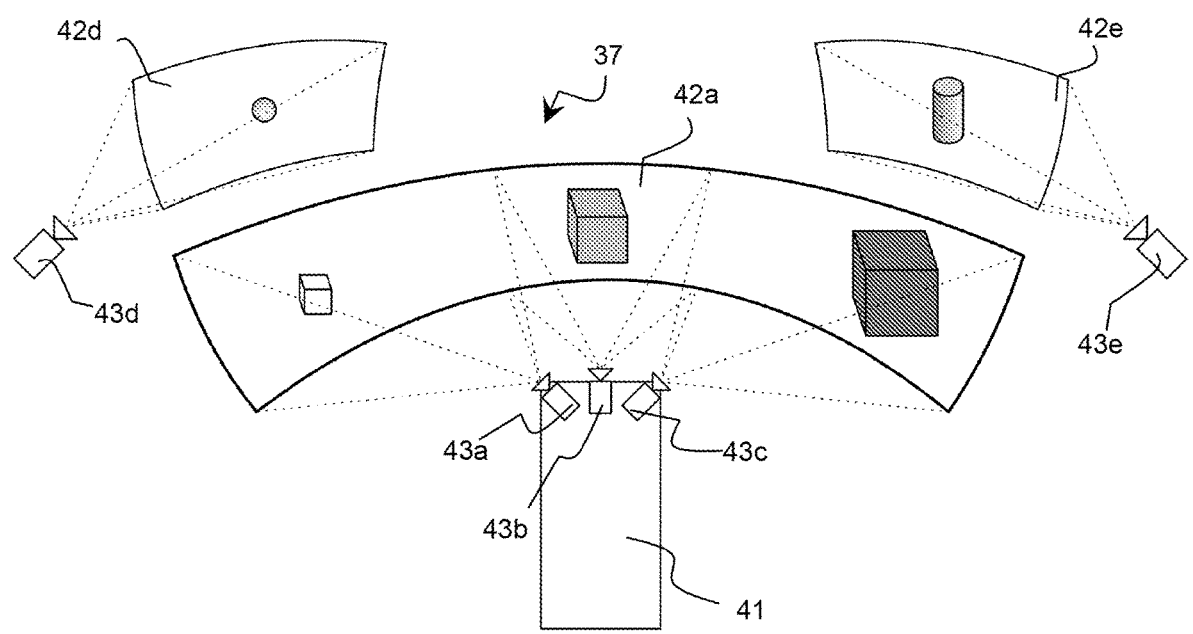
FIG. 4B is an exemplary 3D rendering of the scene shown in FIG. 4A from the perspective of the user sitting in a vehicle, according to an embodiment.

FIG. 4A is a top-down view of the camera rig in field operation, according to an embodiment. Here, a camera rig including three DVC-designated cameras, namely DVC(1) 38a, DVC(2) 38b, and DVC(3) 38c, and two SVC-designated cameras, namely SVC(1) 38d, and SVC(2) 38e, with different fields of views on a vehicle 40 are shown. Also FIG. 4B is a view of the projection rig in field operation, according to an embodiment. Here, the projection rig including projectors (43a through 43e) on the 3D model of the vehicle 41 project the projections 42a through 42c on a dome 37, where the projectors DVP(1) 43a, DVP(2) 43b, and DVP(3) 43c are each projecting live image from cameras DVC(1) 38a, DVC(2) 38b, and DVC(3) 38c, respectively, and their respective projections are merged into the projection 42a, while the projector SVP(1) 43d projects the live image from SVC(1) 38d creating the projection 42d, and the projector SVP(2) 43e projects the live image from SVC(2) 38e creating the projection 42e.

Applications in Vehicle Operation

The embodiments are described with respect to a vehicle operation, but other use case scenarios are also encompassed to be within the scope of the embodiments. The described method can be applied to situations where the operator is on board the vehicle, or in a remote vehicle operation. In both cases, the proposed method provides the operator with a superior situational awareness.

In a remote vehicle operation use case scenario, applying the proposed method can provide the operator with an immersive visual experience and the sense of presence in the remote real-world environment in which a remote vehicle equipped with a camera rig is operating.

In a local (direct) vehicle operation, where the operator is on board the vehicle, applying the proposed method can significantly improve the operator's situational awareness, especially in vehicles where visibility from the operator's position is reduced (e.g., in armored vehicles).

Each of the two applications requires a slightly different variant of implementation of the method in order to improve the user experience and functionality.

Applying the Method to Remote Vehicle Operation

In this use-case scenario, the described method is used to implement a vision system for the operator of a remote vehicle to which a camera rig is attached. In such a setup, the vehicle equipped with a camera rig is moving, the projection rig is stationary in relation to the dome, and the operator is stationary on a fixed platform, independent of the vehicle.

The rotational movement of the vehicle (and thus the camera rig) in relation to the natural horizon (namely: pitching and rolling of the vehicle and camera rig) will cause the projection of the horizon on the dome (the "Virtual Horizon") to rotate (pitch and roll) accordingly.

Given that the operator is physically positioned on a firm platform that is fixed in relation to the operator's real horizon, this rotation of the virtual horizon may cause discomfort (sometimes also referred to as kinetosis, better known as motion sickness or travel sickness), as the operator's visual sense is implying movement that her inner ear does not sense (as the operator is standing on a fixed, motionless platform). The intensity of discomfort will depend on individual physiological predispositions of each operator but can range from mild disorientation to nausea.

To reduce discomfort, a degree of projection stabilization can be implemented in order to reduce the intensity of the movement of the virtual horizon, or to fix it entirely in relation to the operator's real (actual) horizon. This can be done by equipping the vehicle with an Inertial Measurement Unit (the "IMU"), and/or use the live video feed from DVCs and SVCs to perform Visual Inertial Odometry ("VIO") in order to track the movement of the vehicle, and then using the data about the pitching and rolling of the vehicle to rotate the projection rig within the dome in the opposite direction. By moving the projection rig in the opposite direction in relation to the remote vehicle (and thus the camera rig), the movement of the virtual horizon will be compensated, and it will remain fixed in relation to the dome (and thus the remote operator's actual horizon).

This fixing of the virtual horizon will, however, eliminate the information about actual pitching and rolling of the vehicle, which may be relevant and useful in performing the remote operation function. This information can be conveyed to the operator by rendering a virtual model of the vehicle within the Dome and using the IMU and/or VIO data to replicate its pitch and roll movements in real time.

Applying the Method to On-Board Vehicle Operation

In this use-case scenario, the described method is used to implement a vision system for the operator on board the vehicle. This may be beneficial for situations where the visibility from the operator's seat does not provide an adequate degree of situational awareness due to blind spots and/or operational limitations. A good example is armored vehicles, in which the visibility from operators' position is typically severely limited. In such a setup, the operator is positioned within the vehicle, moves with the vehicle (and so does the camera rig mounted on it), and is thus exposed to the same inertial forces the vehicle is exposed to.

Here too the pitching and rolling of the vehicle (and the camera rig) in relation to the natural horizon will cause a proportional pitching and rolling of the virtual horizon in relation to the dome, but because the operator actually moves together with the vehicle and the camera rig, the user's visual perception of the movement will be congruent with the inertial forces that the user's inner ear will actually sense, so there should be no discomfort.

However, while this setup provides for congruence between human visual and inertial perception, it confuses the computer hardware. VR headsets typically rely on a combination of visual sensors (cameras) and inertial sensors in order to track the head pose in 6DoF, which causes a problem in this particular setup. In a typical setup, both the visual and inertial sensors on the VR headset are taking measurements from effectively the same frame of reference, as the environment from which visual sensors are taking cues (e.g., a room) is typically fixed in relation to the inertial frame of reference (Earth's gravity), so effectively they are one single frame of reference.

In this particular setup, however, we have two inertial frames of reference: Earth's gravity as the global frame of reference, to which the inertial frame of reference of the moving vehicle is superimposed. So, when visual sensors would be taking visual cues from the headset's movement, they would only register the component of the movement relative to the inside of the vehicle, while the component of the movement in relation to the global frame of reference (Earth) would not be registered by the visual sensors. Inertial sensors, on the other hand, would sense the movement in relation to the global frame of reference.

Therefore, the methods typically used to determine the head pose in 6DoF by combining the measurements from the inertial and visual sensors would be 'confused', because the inertial sensor would pick up movements both of the headset in relation to the vehicle and the vehicle in relation to the global frame of reference, while visual sensors would only be picking up the former component, resulting in an erratic movement of the operator's viewpoint within the Dome. This would cause the user's overall visual experience to imply a movement that is inconsistent with the movement the user would experience with the sense of inertia.

Given that the dome is effectively fixed to the vehicle's frame of reference by the virtue of camera rig being fixed to the vehicle and the projection rig being fixed to the dome, movements of the operator's viewpoint in the Dome should be driven exclusively by the movement of the headset relative to the vehicle, while the movement of the vehicle relative to the global frame of reference should be ignored. This can be done either by relying exclusively on visual sensors in 6DoF head tracking, or subtracting the movement of the vehicle from the movement of the headset by combining the measurement data from the inertial sensors in the headset with that from the one affixed to the vehicle.

Advantages of the Method

The method as disclosed does not require cameras to be arranged in a circular arrangement, thus enabling the camera arrangement to be adjusted to the vehicle geometry, optimizing for function, convenience, inconspicuity, robustness, or the combination thereof. The virtual scene is rendered with an aim to create a realistic and spatially accurate virtual representation of the real environment being captured by the camera rig.

Further, to facilitate both teleoperation and direct operation use case scenarios, the method allows the geometric extent of the vehicle to be rendered within the virtual scene that is recreated for the user, and it is done in a spatially accurate way so that the user gets a realistic perception of the vehicle within its environment, which enables precise navigation in complex environments replete with obstacles. This also gives the user a more accurate representation of the spatial relationship of the vehicle in relation to the real-world environment.

The method also enables placing the user at the specific place within the virtual representation of the vehicle, which enables keeping the user's spatial perception within the virtual environment congruent with what the user's spatial perception would be in the real world. This is useful in cases where user is onboard the vehicle, and it is necessary to preserve the user's capability to operate the vehicle without the system of the invention. If the system would give the user a virtual vantage point that is different from her actual vantage point, switching from one to another would cause a temporary disorientation, which would reduce operator's effectiveness in case the operator needs to switch between two modes of operation.

In case of a teleoperation application, this method helps user's experience to more accurately mimic the actual experience the user would have if the user were to be physically present in the remote location that is being virtually reconstructed.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

We claim:

1. A method for displaying a virtual scene, the method comprising:
    forming a camera rig by positioning a plurality of cameras on an object; the plurality of cameras comprising a plurality of Direct View Cameras and at least one Secondary View Camera;
    positioning the plurality of Direct View Cameras and the at least one Secondary View Camera at selected locations on the surface of the object; wherein the plurality of Direct View Cameras are positioned in a non-circular arrangement;
    forming a projecting rig that comprises a plurality of projectors and a dome; the plurality of projectors comprising a plurality of Direct View Projectors and at least one Secondary View Projector,
    associating each of the plurality of Direct View Projectors with a corresponding one of the plurality of Direct View Cameras, and positioning each of the plurality of Direct View Projectors such that each of the plurality of Direct View Projectors comprises a relative direction and a spatial position identical to a direction and a spatial position of the corresponding Direct View Camera, wherein each of the plurality of Direct View Projectors is capable of receiving images from the corresponding Direct View Camera,
    associating the at least one Secondary View Projector with a corresponding one of the at least one Secondary View Camera, wherein each Secondary View Projector is capable of receiving images from the corresponding Secondary View Camera; and projecting by all of the plurality of projectors the images received from each corresponding camera onto an inner surface of the dome.

2. The method of claim 1 further comprising predefining a number of the Direct View Cameras and the Secondary View Cameras to be placed.

3. The method of claim 1 wherein the Direct View Camera is positioned such that there is an overlap between a field of view of the Direct View Camera with at least one other of the cameras.

4. The method of claim 1 wherein the selected locations are selected to align to a specific geometry.

5. The method of claim 1 wherein the object is a vehicle.

6. The method of claim 1 wherein the object is a 3D model.

7. The method of claim 1 further comprising positioning the at least one Secondary View Projector such that the at least one Secondary View Projector comprises a direction and spatial position that is different than a direction and spatial position of the corresponding Secondary View Camera.

8. A method of displaying a virtual scene, the method comprising:
providing a camera rig with a plurality of cameras, comprising:
providing a 3D model of an object, wherein the 3D model comprises a surface;
designating each camera of the plurality of cameras as a Direct View Camera or a Secondary View Camera; the plurality of cameras comprising a plurality of Direct View Cameras and at least one Secondary View Camera,
specifying a direction, a rotation along a longitudinal axis and a field of view for each camera of the plurality of cameras; and
positioning the Direct View Cameras and the at least one Secondary View Camera at selected locations on the surface of the 3D model of the object; wherein the plurality of Direct View Cameras are positioned in a non-circular arrangement;
providing a projection rig that comprises a plurality of projectors within a hollow half-sphere, wherein the hollow half-sphere comprises an inner surface and an outer surface;
designating each projector of the plurality of projectors as a Direct View Projector or a Secondary View Projector;
positioning each of the Direct View Projector such that each Direct View Projector corresponds to a Direct View Camera by having a spatial position, direction, rotation along a longitudinal axis and field of view identical to the spatial position, direction, rotation along the longitudinal axis and field of view of the corresponding Direct View Camera and capable of receiving images from the corresponding Direct View Camera;
associating each of the Secondary View Projectors with a corresponding Secondary View Camera such that each of the Secondary View Projectors is capable of receiving images from the corresponding Secondary View Camera;
positioning of each of the Secondary View Projectors in a manner such that at least one of the Secondary View Projectors comprises a spatial position, direction, rotation along a longitudinal axis and field of view that is different than a spatial position, direction, rotation along a longitudinal axis and field of view of the corresponding Secondary View Camera; and
projecting by all the projectors the images obtained from each corresponding camera onto the inner surface of the hollow half-sphere.

9. The method of claim 8 wherein the spatial position is defined by Cartesian coordinates.

10. The method of claim 8 wherein the direction is defined by pitch and yaw.

11. The method of claim 8 wherein the rotation along the longitudinal axis is defined by roll.

12. The method of claim 8 wherein for an on-board vehicle operation, where a dome is effectively fixed to a vehicle's frame of reference by virtue of the camera rig being fixed to the vehicle and a projection rig being fixed to the dome, movements of an operator's viewpoint in the dome are driven by the movements of a headset relative to the vehicle, while the movements of the vehicle relative to a global frame of reference are ignored.

13. The method of claim 12, wherein the movements of the operator's viewpoint in the dome are determined either by relying on visual sensors in 6 degrees of freedom (6DoF) head tracking, or by subtracting the movement of the vehicle from the movement of the headset by combining measurement data from inertial sensors in the headset with measure data from the one affixed to the vehicle.

14. A system for displaying a virtual scene, the system comprising:
a 3D model of an object comprising a surface;
a camera rig that comprises a plurality of cameras positioned at selected locations on the surface of the 3D model of the object, wherein each camera of the plurality of cameras is designated as a Direct View Camera or a Secondary View Camera, the plurality of cameras comprises a plurality of Direct View Cameras and at least one Secondary View Camera, wherein each camera of the plurality of cameras is associated with a direction, a rotation along a longitudinal axis and a field of view; the plurality of Direct View Cameras being positioned in a non-circular arrangement; and
a projection rig that comprises a plurality of projectors within a hollow half-sphere, wherein the hollow half-sphere comprises an inner surface and an outer surface, wherein each projector of the plurality of projectors is designated as a Direct View Projector or a Secondary View Projector, the plurality of projectors comprises a plurality of Direct View Projectors and at least one Secondary View Projector, wherein
the plurality of projectors are positioned such that each Direct View Projector corresponds to a Direct View Camera comprising identical spatial position, direction, rotation along a longitudinal axis and field of view of the corresponding Direct View Camera and capable of receiving images from the corresponding Direct View Camera,
the at least one Secondary View Projector corresponds to the at least one Secondary View Camera on the camera rig and is capable of receiving images from the corresponding Secondary View Camera, wherein the at least one Secondary View Projector comprises a spatial position that is different than the spatial position of the corresponding Secondary View Camera, and
all the projectors of the plurality of projectors are configured to project the images obtained from the corresponding cameras onto the inner surface of the hollow half-sphere.

15. The system of claim 14 wherein the spatial position is defined by Cartesian coordinates.

16. The system of claim 14 wherein the direction is defined by pitch and yaw.

17. The system of claim 14 wherein the rotation along the longitudinal axis is defined by roll.

18. The system of claim 14 wherein for remote vehicle operation, where the camera rig is attached to a vehicle, a degree of projection stabilization is implemented in order to reduce intensity of movement of virtual horizon by moving the projection rig in an opposite direction in relations to the vehicle.

19. The system of claim 18, wherein the movement of the projection rig is determined by equipping the vehicle with an Inertial Measurement Unit (the "IMU"), and/or using a live video feed from DVCs and SVCs to perform Visual Inertial Odometry ("VIO") in order to track the movement of the vehicle, and then using pitching data and rolling data of the vehicle to rotate the projection rig within a dome in the opposite direction.

* * * * *